United States Patent
Hong et al.

(10) Patent No.: US 9,634,311 B2
(45) Date of Patent: *Apr. 25, 2017

(54) SEPARATOR INCLUDING COATING LAYER AND BATTERY INCLUDING THE SAME

(71) Applicants: Ki Chul Hong, Uiwang-si (KR); Myung Kook Park, Uiwang-si (KR); Jin Kyu Park, Uiwang-si (KR); Jun Ho Chung, Uiwang-si (KR)

(72) Inventors: Ki Chul Hong, Uiwang-si (KR); Myung Kook Park, Uiwang-si (KR); Jin Kyu Park, Uiwang-si (KR); Jun Ho Chung, Uiwang-si (KR)

(73) Assignee: Cheil Industries, Inc., Gumi-Si, Kyeongsangbuk-do (KR)

(*) Notice: Subject to any disclaimer, the term of this patent is extended or adjusted under 35 U.S.C. 154(b) by 280 days.

This patent is subject to a terminal disclaimer.

(21) Appl. No.: 13/778,332

(22) Filed: Feb. 27, 2013

(65) Prior Publication Data

US 2013/0224553 A1 Aug. 29, 2013

(30) Foreign Application Priority Data

Feb. 29, 2012 (KR) .................. 10-2012-0021140

(51) Int. Cl.
*H01M 2/16* (2006.01)
*H01M 10/052* (2010.01)

(52) U.S. Cl.
CPC ......... *H01M 2/1686* (2013.01); *H01M 2/166* (2013.01); *H01M 2/1653* (2013.01); *H01M 10/052* (2013.01)

(58) Field of Classification Search
CPC .......................... H01M 2/1646; H01M 2/1686

USPC .................. 429/129–147, 247–255
See application file for complete search history.

(56) References Cited

U.S. PATENT DOCUMENTS

| | | | |
|---|---|---|---|
| 7,662,517 B2 | 2/2010 | Lee et al. | |
| 9,412,988 B2* | 8/2016 | Hong | ........... H01M 2/1686 |
| 2002/0192561 A1 | 12/2002 | Noh | |
| 2006/0105244 A1* | 5/2006 | Kejha | ........... H01G 9/02 |
| | | | 429/242 |
| 2007/0020525 A1* | 1/2007 | Kim | ........... H01M 2/145 |
| | | | 429/251 |
| 2007/0048602 A1* | 3/2007 | Kim | ........... H01M 2/166 |
| | | | 429/144 |

(Continued)

FOREIGN PATENT DOCUMENTS

| | | |
|---|---|---|
| CN | 1381911 A | 11/2002 |
| CN | 102088067 A | 6/2011 |

(Continued)

OTHER PUBLICATIONS

European Search Report in EP 13157184.6-1360, dated Jun. 3, 2013 (Hong, et al.).

(Continued)

*Primary Examiner* — Patrick Ryan
*Assistant Examiner* — Kiran Akhtar
(74) *Attorney, Agent, or Firm* — Lee & Morse, P.C.

(57) ABSTRACT

A separator includes a coating layer, the coating layer containing a polyvinylidene fluoride homopolymer, a polyvinylidene fluoride-hexafluoropropylene copolymer, a solvent, and inorganic particles, the solvent being present in an amount of about 100 ppm or less in the coating layer.

18 Claims, 2 Drawing Sheets

(56) References Cited

U.S. PATENT DOCUMENTS

| | | | | |
|---|---|---|---|---|
| 2007/0082261 | A1* | 4/2007 | Lee | H01M 2/145 |
| | | | | 429/144 |
| 2011/0293976 | A1* | 12/2011 | Chiba | H01M 2/166 |
| | | | | 429/94 |
| 2011/0293977 | A1 | 12/2011 | Kim et al. | |
| 2013/0017429 | A1* | 1/2013 | Ha | H01M 2/1653 |
| | | | | 429/144 |
| 2013/0115519 | A1* | 5/2013 | Lee | C08G 73/1042 |
| | | | | 429/252 |

FOREIGN PATENT DOCUMENTS

| | | | |
|---|---|---|---|
| EP | 1011157 A2 | 6/2000 | |
| EP | 2378595 A2 | 10/2011 | |
| JP | 2006-120462 A | 5/2006 | |
| KR | 10-2006-0072065 A | 6/2006 | |
| KR | 100727248 B1 | 6/2007 | |
| KR | 10-2012-0015729 | 2/2012 | |
| WO | WO2011/115376 | * 9/2011 | ............. H01M 2/14 |
| WO | WO2011/159087 | * 12/2011 | ........ H01M 10/0525 |

OTHER PUBLICATIONS

Office Action issued Jun. 20, 2014 in corresponding Korean Patent Application No. 10-2012-0021140.

* cited by examiner

SEPARATOR INCLUDING COATING LAYER AND BATTERY INCLUDING THE SAME

CROSS-REFERENCE TO RELATED APPLICATION

Korean Patent Application No. 10-2012-0021140, filed on Feb. 29, 2012 in the Korean Intellectual Property Office, and entitled: "SEPARATOR INCLUDING COATING LAYER OF ORGANIC AND INORGANIC MIXTURE, AND BATTERY INCLUDING THE SAME," is incorporated by reference herein in its entirety.

BACKGROUND

1. Field

Embodiments relate to a separator including a coating layer and a battery including the same.

2. Description of the Related Art

A separator for an electrochemical battery refers to a middle layer disposed inside a battery to isolate a positive electrode and a negative electrode from each other while maintaining ionic conductivity to permit charge and discharge of the battery.

Recently, electrochemical batteries have been developed to have a lighter and thinner structure to improve portability of electronic devices such as mobile devices and notebook computers while ensuring high output and high capacity for use in electric cars and the like.

SUMMARY

Embodiments are directed to a separator, including a coating layer, the coating layer containing a polyvinylidene fluoride homopolymer, a polyvinylidene fluoride-hexafluoropropylene copolymer, a solvent, and inorganic particles, the solvent being present in an amount of about 100 ppm or less in the coating layer.

The polyvinylidene fluoride homopolymer may have a weight average molecular weight of about 1,000,000 g/mol or more.

The polyvinylidene fluoride homopolymer may have a weight average molecular weight of about 1,000,000 g/mol to about 1,200,000 g/mol.

The polyvinylidene fluoride-hexafluoropropylene copolymer may have a weight average molecular weight of about 800,000 g/mol or less.

The coating layer may contain, based on 100 parts by weight of the coating layer in terms of solid content, about 5 to about 10 parts by weight of the polyvinylidene fluoride homopolymer; about 5 to about 20 parts by weight of the polyvinylidene fluoride-hexafluoropropylene copolymer; about 0.0001 parts by weight or less of the solvent; and about 70 to about 90 parts by weight of the inorganic particles.

The solvent may have a boiling point of about 140° C. or more.

The solvent may include one or more of dimethylformamide, dimethylsulfoxide, dimethylacetamide, or N-methylpyrrolidone.

The inorganic particles may include one or more of $Al_2O_3$ particles, $SiO_2$ particles, $B_2O_3$ particles, $Ga_2O_3$ particles, $TiO_2$ particles, or $SnO_2$ particles.

The coating layer may be formed by dip coating.

The coating layer may have a peel strength of about 50 $gf/cm^2$ or more.

An adhesive strength between the coating layer and electrodes of a battery may be about 20 $gf/cm^2$ or more.

The battery may be a lithium rechargeable battery.

The electrodes may include a positive electrode and a negative electrode, the positive electrode may be selected from the group of a lithium cobalt oxide electrode, a lithium nickel cobalt manganese oxide electrode, a lithium manganese oxide electrode, a lithium iron phosphate electrode, and a lithium nickel oxide electrode, and the negative electrode may be selected from the group of a crystalline carbon electrode and amorphous carbon electrode.

The separator may have a thermal shrinkage of about 30% or less in a machine direction or in a transverse direction, as measured after leaving the separator at 150° C. for 1 hour.

Embodiments are also directed to an electrochemical battery, including a positive electrode, a negative electrode, an electrolyte, and a separator according to an embodiment.

The electrochemical battery may be a lithium rechargeable battery.

Embodiments are also directed to a secondary battery, including a positive electrode, a negative electrode, an electrolyte, and a separator interposed between the positive electrode and the negative electrode, the separator having a coating layer thereon, the coating layer being formed by dissolving a polyvinylidene fluoride-hexafluoropropylene copolymer having a weight average molecular weight of about 800,000 g/mol or less in a first solvent to provide a first mixture, dissolving a polyvinylidene fluoride homopolymer having a weight average molecular weight of about 1,000,000 g/mol or more in a second solvent to provide a second mixture, combining the first mixture and the second mixture with inorganic particles to form a coating agent, applying the coating agent to the separator, and removing the solvent from the applied coating agent so as to provide the coating layer with a residual amount of solvent of about 100 ppm or less.

The second solvent may have a boiling point of about 140° C. or more.

The second solvent may include one or more of dimethylformamide, dimethylsulfoxide, dimethylacetamide, or N-methylpyrrolidone.

The removing of the solvent may include drying the separator with the coating agent thereon at a maximum temperature of about 120° C. or less.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
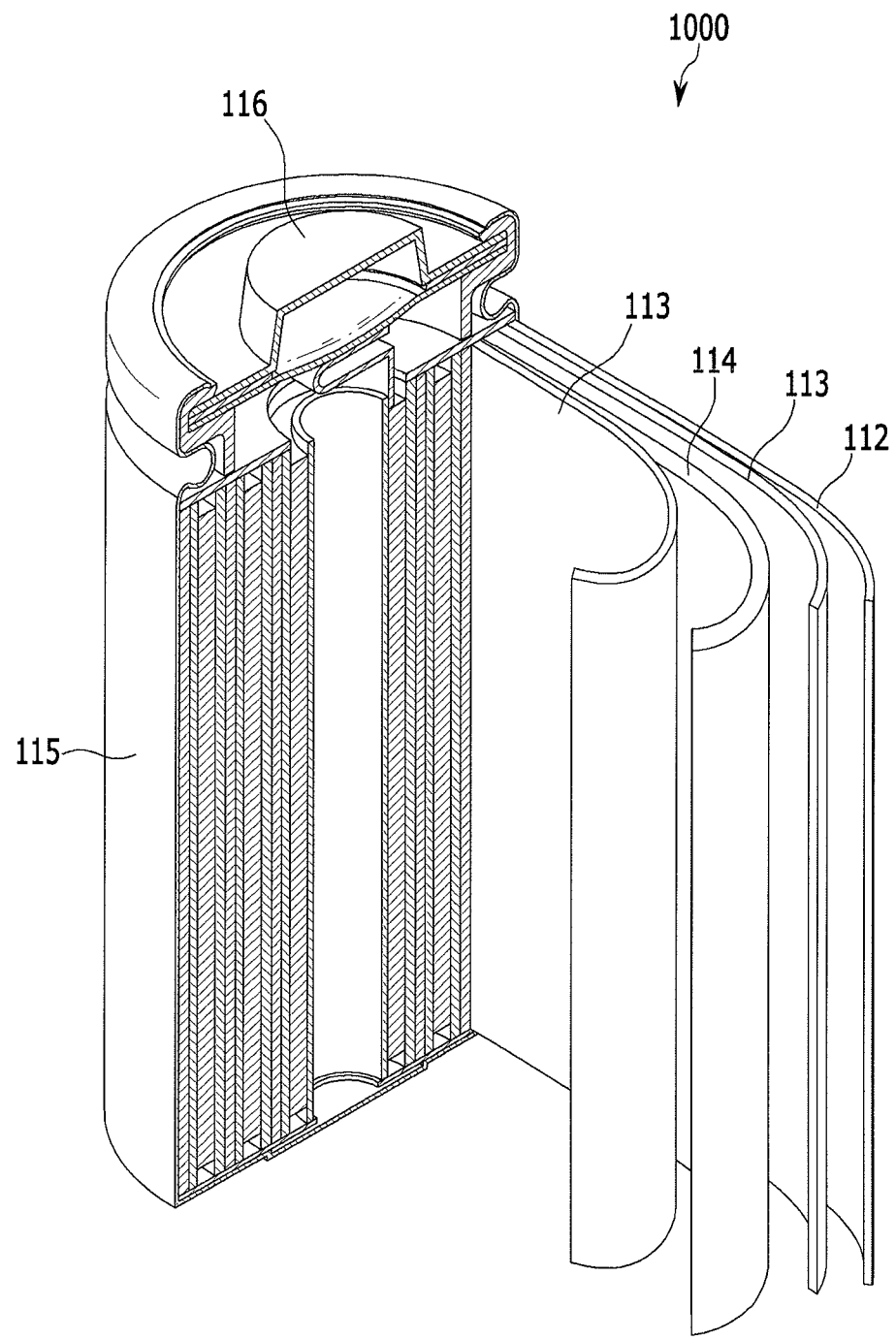
FIG. 1 illustrates a schematic view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic view of a rechargeable battery according to an embodiment.

Referring to FIG. 1, a rechargeable battery 1000 according to an embodiment may include an electrode assembly including a positive electrode 114, a negative electrode 112 (facing the positive electrode 114), a separator 113 (interposed between the positive electrode 114 and negative electrode 112), an electrolyte solution (not shown), a battery case 115 (accommodating the electrode assembly), and a sealing member 116 (sealing the battery case 115). FIG. 1 shows a cylindrical rechargeable battery as an example; embodiments may be applied to other types of batteries, e.g., prismatic, etc.

Figure 2:
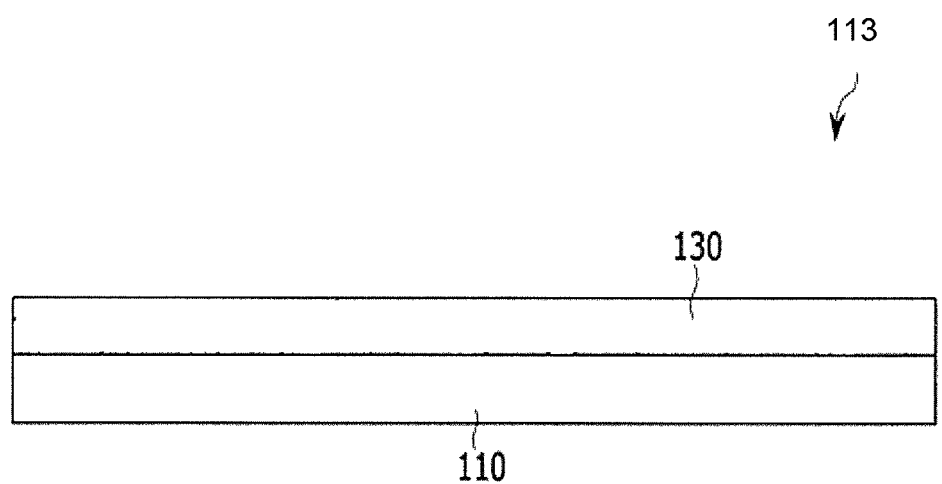
FIG. 2 illustrates a cross-sectional view of a separator for a rechargeable battery according to an embodiment.

FIG. 2 illustrates a cross-sectional view of a separator for a rechargeable battery according to an embodiment.

In the example embodiment shown in FIG. 2, the separator 113 for the rechargeable battery 1000 according to an embodiment may include a base film 110 and a coating layer 130 on one side (or both sides) of the base film 110. The coating layer 130 may include an organic and inorganic mixture formed on one or both sides of the base film 110.

In an example embodiment, a separator includes a coating layer of an organic and inorganic mixture containing a polyvinylidene fluoride homopolymer, a polyvinylidene fluoride-hexafluoropropylene copolymer, a solvent, and inorganic particles, in which the solvent may be present in an amount of 100 ppm or less in the coating layer.

According to the present embodiment, the polyvinylidene fluoride (PVdF) homopolymer may have a weight average molecular weight of about 1,000,000 g/mol or more, e.g., about 1,000,000 g/mol to about 1,200,000 g/mol.

Within this molecular weight range, the polyvinylidene fluoride homopolymer may improve adhesion between the coating layer and the base film to achieve efficient suppression of thermal shrinkage of a polyolefin base film, which may be susceptible to heat, and may provide good adhesion between the coating layer and electrodes to help prevent a short circuit between electrodes.

Also, within this molecular weight range, the polyvinylidene fluoride homopolymer may be smoothly dissolved in dimethylformamide (DMF), and thus may help minimize the use of solvent and possible defects during a drying process.

According to the present embodiment, the polyvinylidene fluoride-hexafluoropropylene copolymer preferably has a weight average molecular weight of about 800,000 g/mol or less, e.g., about 600,000 g/mol to about 800,000 g/mol.

Within this molecular weight range of the polyvinylidene fluoride-hexafluoropropylene copolymer, the separator may provide excellent electrolyte impregnation, and a battery including the separator may achieve efficient output of electricity.

In the polyvinylidene fluoride-hexafluoropropylene copolymer used in the present example embodiment, hexafluoropropylene may be present in an amount of about 0.1 to about 40% by weight based on the total weight of the copolymer.

The solvent used in the present example embodiment may be a solvent that sufficiently dissolves a polyvinylidene fluoride homopolymer. In an implementation, the solvent may sufficiently dissolve a polyvinylidene fluoride homopolymer having a high molecular weight. In an implementation, the solvent may sufficiently dissolve a polyvinylidene fluoride homopolymer having a weight average molecular weight of about 1,000,000 g/mol or more. The expression "sufficiently dissolve a polyvinylidene fluoride homopolymer" means that the organic binder is sufficiently dissolved in a solvent so as to be used as a coating agent. For example, it can be considered that a polyvinylidene fluoride homopolymer is sufficiently dissolved in a solvent in the case that the remaining amount of the organic binder not dissolved in the solvent is less than or equal to 1 wt % when mixing and stirring the polyvinylidene fluoride homopolymer with the solvent at 25° C. for 4 hours.

The solvent may have a boiling point of about 140° C. or more. Examples of the solvent may include dimethylformamide (DMF), dimethylsulfoxide (DMSO), dimethylacetamide (DMAc), N-methylpyrrolidone (NMP), and the like. These may be used alone or in combinations thereof.

According to the present embodiment, the inorganic particles may include one or more of, e.g., $Al_2O_3$, $SiO_2$, $B_2O_3$, $Ga_2O_3$, $TiO_2$, or $SnO_2$ particles, without being limited thereto.

In an implementation, the inorganic particles are $Al_2O_3$ particles.

The inorganic particles may have an average particle size of, e.g., about 1 nm to about 2,000 nm, e.g., about 100 nm to about 1,000 nm. Within this size range, the inorganic particles may prevent deterioration in coating processibility and dispersion within the coating agent, deterioration in mechanical properties, and increase in electric resistance by allowing suitable thickness adjustment of the coating layer through increase in density of the coating layer. Further, pores of a suitable size may be created in the coating layer, thereby lowering the likelihood of internal short circuit upon charge and discharge of the battery.

The coating layer may contain, e.g., about 5 to about 10 parts by weight of the polyvinylidene fluoride homopolymer; about 5 to about 20 parts by weight of the polyvinylidene fluoride-hexafluoropropylene copolymer; about 0 to 0.0001 parts by weight or less of the solvent; and about 70 to about 90 parts by weight of the inorganic particles, based on 100 parts by weight of the coating layer in terms of solid content.

Within this range, the inorganic particles may provide thermal stability, that is, heat resistance and heat dissipation, the organic binder may provide sufficient improvement of adhesion, and the coating layer may be formed in a relatively flat shape by preventing deterioration in coating processibility and dispersion of the coating agent.

Specifically, within this content range, the organic binder may prevent an excessive reduction in amount of the inorganic particles while sufficiently improving adhesion of the coating layer, thereby providing suitable heat dissipation and heat resistance.

Further, within this content range, the inorganic particles may achieve effective suppression of thermal shrinkage of the separator through sufficient heat dissipation while allowing the organic binder to be added in a desired amount or more so as to provide strong adhesion.

Further, within this content ratio of the solvent for dissolving the polyvinylidene fluoride homopolymer, the remaining amount of the solvent in the finally coating layer may be reduced to a predetermined range or less, e.g., about 100 ppm or less, thereby preventing deterioration in adhesion of the coating layer due to an excess of the solvent remaining in the finally coating layer.

In the expression "0 to 0.0001 parts by weight" of the solvent, "0 to" does not mean that the coating layer does not contain any solvent, but that the coating layer contains the solvent in an amount approaching 0, or expressed by a value of 0 due to measurement limitations of a mechanical instrument.

According to the present embodiment, the coating agent of the organic and inorganic mixture contains the polyvinylidene fluoride homopolymer and the polyvinylidene fluoride-hexafluoropropylene copolymer as organic binder polymer resins, and the inorganic particles. The coating agent may further contain suitable solvents and other additives.

In preparation of the coating agent used in the present example embodiment, the polyvinylidene fluoride homopolymer, the polyvinylidene fluoride-hexafluoropropylene copolymer, and the inorganic particles may be dissolved in suitable solvents, respectively, and mixed with each other.

For example, the polyvinylidene fluoride homopolymer may be prepared as a polymer solution, which is obtained by dissolving the polyvinylidene fluoride homopolymer in dimethylformamide (DMF). The polyvinylidene fluoride-hexafluoropropylene copolymer may be prepared as a polymer solution, which is obtained by dissolving the polyvinylidene fluoride-hexafluoropropylene copolymer in acetone, and the inorganic particles may be prepared as an inorganic dispersion, which is obtained by dissolving the inorganic particles in acetone.

The polymer solutions and the inorganic dispersion may be mixed in a suitable solvent to prepare a coating agent.

Solvents used in the present example embodiment may include, e.g., ketones such as acetone, alcohols such as methanol, ethanol, isopropyl alcohol, and the like, etc. These solvents may provide an advantage of allowing easy removal upon drying after coating.

According to the present embodiment, the coating agent may be prepared in the form of a mixture obtained by sufficiently stirring the polymer solutions, the inorganic dispersion and the solvent using, e.g., a ball mill, a bead mill, or a screw mixer.

The separator of the present embodiment may be prepared by coating the coating agent on one or both sides of the base film, followed by drying the coating agent.

A suitable coating method may be used to coat the base film with the coating agent. For example, dip coating, die coating, roll coating, or comma coating may be used. Such coating processes may be used alone or in combination thereof.

In an implementation, the coating layer of the separator is formed by dip coating.

For example, with a coating bath filled with the coating agent prepared by mixing the aforementioned components in a certain ratio, a polyolefin base film is passed through the coating bath while adjusting the coating amount using a Mayer bar, and is then subjected to drying to form a coating layer on the base film.

In a final coating layer on the separator of the present embodiment, the solvent used to dissolve the polyvinylidene fluoride homopolymer may remain in an amount of about 100 ppm or less.

Herein, the remaining solvent amount of about 100 ppm or less in the coating layer technically means that the remaining amount of the solvent may exceed 0 and is about 100 ppm or less. For example, the remaining amount of the solvent may exceed about 10 ppm and may be about 100 ppm or less.

The coating layer may be obtained by, e.g. coating the polyolefin base film with the coating agent and drying. For example, the coating layer may be dried at 120° C. for 0.03 hours.

By maintaining the amount of the remaining solvent in the coating layer of the separator at about 100 ppm or less, the organic binder component may exhibit good adhesion due to a minimum of the solvent. As a result, the coating layer may enable efficient suppression of thermal shrinkage of the base film because of good adhesion. Further, the coating layer may enable good performance of the battery without participating in electrochemical reaction upon charge and discharge of the battery, and may help prevent a short circuit of the electrodes upon overheating of the battery.

In manufacture of the separator including the coating layer, the organic binder component for the coating agent may be prepared in the form of a solution in which the organic binder is dissolved in a suitable solvent, as described above.

When a low boiling point solvent such as acetone is used as the solvent to prepare the coating agent, the solvent may be easily dried and thus substantially does not remain in a final separator after forming the coating layer thereon. However, a low boiling point solvent may not be highly effective to dissolve the polyvinylidene fluoride homopolymer having a weight average molecular weight of about 1,000,000 g/mol or more.

On the other hand, when a high boiling point solvent, such as DMF, DMSO, DMAc, NMP, and the like, is used, the solvent may dissolve the polyvinylidene fluoride homopolymer having a high molecular weight but may be difficult to dry by typical coating and drying processes, and thus may remain in excess in the coating layer.

In the separator according to the present embodiment, the polyvinylidene fluoride homopolymer having a weight average molecular weight of about 1,000,000 g/mol or more is used as the organic binder component of the coating agent, and the remaining amount of the solvent used for dissolving the polyvinylidene fluoride homopolymer is about 100 ppm or less in the coating layer.

By way of example, the remaining amount of the solvent in the coating layer may be measured as follows. For example, when DMF is used as a solvent for dissolving the polyvinylidene fluoride homopolymer, a certain amount of the coating layer (or a certain amount of the separator having the coating layer) is dipped in methanol for about 4 hours to extract DMF from the coating layer. Then, the methanol containing DMF is analyzed through a gas chromatography to measure the amount of DMF remaining in the coating layer.

According to the present embodiment, the coating layer of the organic and inorganic mixture may have a thickness of about 0.01 μm to about 20 μm, e.g., about 1 μm to about 15 μm. Within this thickness range, the coating layer may be formed to a suitable thickness to have excellent thermal stability and adhesion, and may prevent the separator from being excessively thickened to avoid increasing the internal resistance of the battery.

According to the present embodiment, the polyolefin base film may be selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

The polyolefin base film may have a thickness of about 1 μm to about 40 μm, e.g., about 1 μm to about 25 μm. Within this thickness range of the base film, the separator may be formed to a suitable thickness to help prevent a short circuit of the positive electrode and the negative electrode while improving stability of the battery. Additionally, a thickness of the separator in this range may help provide a low internal resistance of the battery.

In the separator including the coating layer of the organic and inorganic mixture, peel strength between the coating layer and the polyolefin base film may be about 50 gf/cm$^2$ or more. Within this range, the coating layer may have good peeling resistance, and it may be possible to prevent separation of the inorganic particles from the coating layer in a process of assembling the battery using the separator. Further, within this range, the separator may exhibit sufficiently strong adhesion between the coating layer and the base film to prevent shrinkage of the base film due to heat, and prevent separation between the coating layer and the base film due to overheating of the battery, thereby preventing short circuit of the electrodes while improving thermal stability.

A suitable method may be used to measure the peel strength of the coating layer.

For example, the peel strength of the coating layer can be measured as follows: a prepared coating layer is cut into a 1.5 cm×7 cm specimen, which in turns is strongly attached to a glass plate using a transparent double-sided tape (3M), followed by measuring force required to separate the coating layer using a tensile strength tester (UTM; Universal Test Machine).

When the separator including the coating layer of the organic and inorganic mixture according to the present embodiment is applied to an electrochemical battery, the coating layer may exhibit an adhesive strength of about 20 gf/cm$^2$ or more to electrodes of the battery. Within this range, the coating layer and the electrodes may be sufficiently strongly attached together, which may help prevent short circuit of the positive and negative electrodes. In addition, in production of high output large capacity batteries, the separator may improve stability and lifespan of the batteries.

A suitable method may be used to measure the adhesive strength between the coating layer and the electrodes.

For example, the adhesive strength between the coating layer and the electrodes can be measured as follows: a prepared separator of the present invention is placed between both electrodes to prepare a battery stack of positive electrode/separator/negative electrode, which in turn is inserted into an aluminum pouch. Then, with an electrolyte injected into the aluminum pouch, the aluminum pouch is sealed and formed into a single-plate cell, which in turn is subjected to a force of 100 kgf/cm$^2$ for 20 seconds at 50° C. and left for 12 hours. Next, after disassembling each of the single-plate cells, the battery stack of the positive electrode, the separator and the negative electrode bonded to each other is cut into a size of 1.5 cm (MD)×7 cm (TD) and attached to a glass plate using a transparent double-sided tape (3M), followed by measuring adhesive strength between the electrodes and the separator using a tensile strength tester (UTM; Universal Test Machine).

The separator including the coating layer of the organic and inorganic mixture may have a thermal shrinkage of about 30% or less in a machine direction (MD) or in a transverse direction (TD), as measured after leaving the separator at 150° C. for 1 hour. Within this range, the separator may help prevent short circuit of the electrodes, thereby improving stability of the battery.

A suitable method may be used to measure the thermal shrinkage of the separator.

For example, the thermal shrinkage of the separator can be measured as follows: a prepared separator is cut into a size of about 5 cm (width)×about 5 cm (length) and left in a chamber at 150° C. for 1 hour, followed by measuring degrees of shrinkage in MD and TD directions to calculate thermal shrinkage.

Another embodiment provides an electrochemical battery. In an example embodiment, an electrochemical battery includes the polyolefin porous separator including the coating layer of the organic and inorganic mixture, a positive electrode, and a negative electrode, and is filled with an electrolyte.

Examples of the electrochemical battery of the present embodiment may include lithium rechargeable batteries, such as lithium metal rechargeable batteries, lithium ion rechargeable batteries, lithium polymer rechargeable batteries, lithium ion polymer rechargeable batteries, and the like.

For example, the electrochemical battery according to the present embodiment may be manufactured by placing the polyolefin separator including the coating layer of the organic and inorganic mixture according to the present embodiment between the positive electrode and the negative electrode, and filling a space therebetween with the electrolyte.

The electrodes (positive electrode and negative electrode) of the electrochemical battery according to the present embodiment may be prepared in the form of assemblies of electrode active materials and current collectors, which are combined by a general method.

The positive electrode may include a positive electrode active material that allows reversible intercalation and deintercalation of lithium ions. Such positive electrode active materials may include, e.g., composite metal oxides of lithium and at least one metal selected from cobalt, manganese and nickel. The amount of lithium dissolved between metal elements may be determined in various ways. In addition to these metals, the positive electrode active material may further include an element selected from the group of Mg, Al, Co, Ni, K, Na, Ca, Si, Ti, Sn, V, Ge, Ga, B, As, Zr, Mn, Cr, Fe, Sr, V, and rare earth metal elements. In an implementation, the positive electrode is a composite metal oxide of lithium and a metal selected from the group of Co, Ni, Mn, Al, Si, Ti, and Fe. In an implementation, the positive electrode includes lithium cobalt oxide (LCO, for example, LiCoO$_2$), lithium nickel cobalt manganese oxide (NCM, for example, Li[Ni(x)Co(y)Mn(z)]O$_2$), lithium manganese oxide (LMO, for example, LiMn$_2$O$_4$, LiMnO$_2$), lithium iron phosphate (LFP, for example, LiFePO$_4$), lithium nickel oxide (LNO, for example, LiNiO$_2$), or the like.

The negative electrode may include a negative electrode active material that allows reversible intercalation and deintercalation of lithium ions. Examples of such negative electrode active materials include crystalline or amorphous carbon, or carbonous negative electrode active materials of carbon composites (thermally decomposed carbon, coke, graphite), combusted organic polymer compounds, carbon fibers, tin oxide compounds, lithium metals, or alloys of lithium and other elements. Examples of amorphous carbon may include hard carbon, coke, mesocarbon microbead (MCMB) baked at 1500° C., mesophase pitch-based carbon fiber (MPCF) baked at 1500° C., and the like. Examples of crystalline carbon may include graphite materials, specifically natural graphite, graphitized coke, graphitized MCMB, graphitized MPCF, and the like. The negative electrode may be a crystalline or amorphous carbon electrode.

The positive electrode or negative electrode may be produced by dispersing an electrode active material, a binder, a conductive material, and, if desired, a thickener in a solvent to produce an electrode slurry composition, followed by depositing the slurry composition on an electrode current collector. The positive electrode current collector may be made of aluminum, aluminum alloys, or the like. The negative electrode current collector may be made of copper, copper alloys, or the like. The positive electrode current collector and negative electrode current collector may be prepared in the form of e.g., a foil or mesh.

The positive electrode current collector may include, e.g., aluminum foils, nickel foils, combinations thereof, etc.

The negative electrode current collector may include, e.g., copper foils, gold foils, nickel foils, copper alloy foils, combinations thereof, etc.

The electrolyte may be obtained through dissolution or dissociation of a salt having, for example, a structure of $A^+B^-$ in an organic solvent.

Examples of the $A^+$ component, that is, cation, may include alkali metal cations such as $Li^+$, $Na^+$ or $K^+$, combinations thereof, etc.

Examples of the B– component, that is, anion, may include $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, combinations thereof, etc.

The organic solvent may include one or more of, e.g., propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), γ-butyrolactone, etc.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1 and Comparative Examples 1 to 6

Preparation of Separator Including Coating Layer of Organic and Inorganic Mixture Example 1

(1) Preparation of Coating Agent

1) A polyvinylidene fluoride-hexafluoropropylene ('PVdF-HFP') copolymer (21216, Solvay) having a weight average molecular weight of 700,000 g/mol was added in an amount of 10 wt % to acetone (Daejung Chemicals & Metals), followed by stirring at 25° C. for 4 hours using a stirrer to prepare a first polymer solution.

2) A polyvinylidene fluoride ('PVdF') homopolymer (5130, Solvay) having a weight average molecular weight of 1,100,000 g/mol was added in an amount of 10 wt % to DMF (Daejung Chemicals & Metals), followed by stirring at 25° C. for 4 hours using a stirrer to prepare a second polymer solution.

3) $Al_2O_3$ particles (Nippon Light Metal Company, Ltd.) were added in an amount of 25 wt % to acetone (Daejung Chemicals & Metals), followed by milling for dispersion at 25° C. for 3 hours using a bead mill to prepare an inorganic dispersion.

The prepared first polymer solution, second polymer solution, and inorganic dispersion were mixed in a ratio of first polymer solution:second polymer solution:inorganic dispersion:solvent (acetone) of 1:1:3:6, and stirred at 25° C. for 2 hours using a power mixer to prepare a coating agent.

(2) Preparation of Separator

The prepared coating agent was deposited on both sides of a 9 μm thick polyethylene monolayer base film by dip coating and dried at a temperature of 120° C. and a wind speed of 15 m/s for 0.03 hours to prepare a separator. The separator has a DMF remaining amount of 60 ppm in the coating layer and a coating agent loading amount of 6.9 g/m², and the coating layer had a thickness of 4.5 μm. The term of "a coating agent loading amount" means a weight per unit area of the coating layer.

Comparative Example 1

Acetone was used instead of DMF as a solvent for preparing the second polymer solution in (1) of Example 1. The PVdF homopolymer having a weight average molecular weight of 1,100,000 g/mol was not dissolved in acetone. As a result, the coating agent could not be prepared.

Comparative Example 2

A separator was prepared in the same manner as in Example 1 except that drying was performed at 90° C. in (2) of Example 1.

Comparative Example 3

A separator was prepared in the same manner as in Example 1 except that a coating agent was prepared by mixing the first polymer solution, the inorganic dispersion, and the solvent (acetone) in a ratio of the first polymer solution:inorganic dispersion:solvent (acetone)=2:3:6 without using the second polymer solution in (1) of Example 1 in (1) of Example 1.

Comparative Example 4

A separator was prepared in the same manner as in Example 1 except that a PVdF homopolymer having a weight average molecular weight of 500,000 g/mol was used in (1) of Example 1.

Comparative Example 5

A separator was prepared in the same manner as in Example 1 except that a PVdF homopolymer having a weight average molecular weight of 700,000 g/mol was used in (1) of Example 1.

Comparative Example 6

A separator was prepared in the same manner as in Example 1 except that a PVdF homopolymer having a weight average molecular weight of 900,000 g/mol was used in (1) of Example 1.

In Table 1, the compositions of the coating agents prepared in Example 1 and Comparative Examples 1 to 6 are shown in terms of parts by weight.

TABLE 1

| Composition (parts by weight) | Example 1 | Comparative Example 1 | Comparative Example 2 | Comparative Example 3 | Comparative Example 4 | Comparative Example 5 | Comparative Example 6 |
|---|---|---|---|---|---|---|---|
| PVdF homopolymer | 0.9 | 0.9 | 0.9 | 1.8 | 0.9 | 0.9 | 0.9 |
| PVdF-HFP copolymer | 0.9 | 0.9 | 0.9 | — | 0.9 | 0.9 | 0.9 |
| $Al_2O_3$ | 6.8 | 6.8 | 6.8 | 6.8 | 6.8 | 6.8 | 6.8 |
| DMF | 8.2 | — | 8.2 | — | 8.2 | 8.2 | 8.2 |
| Acetone | 83.2 | 91.4 | 83.2 | 91.4 | 83.2 | 83.2 | 83.2 |

The following Table 2 shows drying conditions for the coating layers prepared in Example 1 and Comparative Examples 2 to 6, the thicknesses of the coating layers, and the loading amounts of the coating layers.

For reference, Comparative Example 1 is not listed in Table 2 since the coating agent was not prepared.

TABLE 2

| | | Example 1 | Comparative Example 2 | Comparative Example 3 | Comparative Example 4 | Comparative Example 5 | Comparative Example 6 |
|---|---|---|---|---|---|---|---|
| Drying conditions | Time (sec) | 0.03 | 0.03 | 0.03 | 0.03 | 0.03 | 0.03 |
| | Temp. (° C.) | 120 | 90 | 120 | 120 | 120 | 120 |
| | Wind speed (m/sec) | 15 | 15 | 15 | 15 | 15 | 15 |
| Thickness of coating layer (μm) | | 4.5 | 4.4 | 4.4 | 4.5 | 4.3 | 4.6 |
| Coating agent loading amount (g/m$^2$) | | 6.9 | 6.9 | 6.7 | 6.8 | 6.6 | 7.2 |

Experimental Example 1

Measurement of Remaining Amount of Solvent in Coating Layer of Separator

Each of the dried separators prepared in Example 1 and Comparative Examples 2 to 6 was dipped in methanol for about 4 hours to extract DMF from the separator. Then, the methanol containing DMF was analyzed through gas chromatography to measure the amount of DMF remaining in the coating layer of the dried separator. Measurement results of the DMF remaining amount are shown in Table 3.

Experimental Example 2

Measurement of Peel Strength Between Coating Layer and Base Film

Each of the coating layers prepared in Example 1 and Comparative Examples 2 to 6 was cut into 1.5 cm×7 cm pieces to prepare a total of 6 specimens. Each of the specimens was strongly attached to a glass plate using a transparent double-sided tape (3M), followed by measuring force required to separate the coating layer using a tensile strength tester (UTM; Universal Test Machine). Measurement results of the peel strength are shown in Table 3.

Experimental Example 3

Measurement of Thermal Shrinkage of Separator

Each of the separators prepared in Example 1 and Comparative Examples 2 to 6 was cut into 5 cm×5 cm pieces to prepare a total of 6 specimens. Each of the specimens was left in a chamber at 150° C. for 1 hour, followed by measuring degrees of shrinkage of each specimen in MD and TD directions to calculate thermal shrinkage. Measurement results of the thermal shrinkage are shown in Table 3.

Experimental Example 4

Measurement of Adhesive Strength Between Coating Layer and Electrode

Each of the separators prepared in Example 1 and Comparative Examples 2 to 6 was placed and bonded between both electrodes of a lithium rechargeable battery to prepare a battery stack of positive electrode/separator/negative electrode, which in turn was inserted into an aluminum pouch. The positive electrode was a lithium cobalt oxide (LCO) electrode, and the negative electrode was a crystalline carbon electrode.

Then, with an electrolyte injected into the aluminum pouch, the aluminum pouch was sealed and formed into a single-plate cell, which in turn was subjected to a force of 100 kgf/cm$^2$ for 20 seconds at 50° C. and left for 12 hours.

Next, after disassembling the single-plate cell, the battery stack of the positive electrode, the separator and the negative electrode bonded to each other was cut into a size of 1.5 cm (MD)×7 cm (TD) and attached to a glass plate using a transparent double-sided tape (3M), followed by measuring adhesive strength between the coating layer and the electrodes using a tensile strength tester (UTM; Universal Test Machine). Measurement results of the adhesive strength between the coating layer and the electrodes are shown in Table 3.

Experimental Example 5

Measurement of Battery Performance (1) Preparation of Lithium Rechargeable Battery
1) Preparation of Positive Electrode
96 wt % of $LiCoO_2$ as a positive electrode active material, 2 wt % of carbon black as a conductive material, and 2 wt % of PVdF as a binder were added to N-methyl-2-pyrrolidone (NMP) to prepare a positive electrode slurry. The positive electrode slurry was deposited on a 15 μm thick Al foil as a positive electrode current collector and dried to prepare a positive electrode, which in turn was subjected to roll pressing.

2) Preparation of Negative Electrode
94 wt % of carbon powder as a negative electrode active material, 5 wt % of PVdF as a binder, and 1 wt % of carbon black as a conductive material were added to NMP to prepare a negative electrode slurry. The negative electrode slurry was deposited on a 10 μm thick copper foil as a negative electrode current collector and dried to prepare a negative electrode, which in turn was subjected to roll pressing.

3) Preparation of Battery
The positive electrode, the negative electrode and each of the separators prepared in Example 1 and Comparative Examples 2 to 6 were combined in a winding manner, followed by injection of an electrolyte into the assembled structure, thereby preparing a lithium rechargeable battery. Here, the electrolyte was prepared by dissolving ethylenecarbonate (EC)/ethylmethylcarbonate (EMC)/diethylcarbonate in a volume ratio of 3:5:2 in 1.15 M lithium hexafluorophosphate ($LiPF_6$).

(2) Measurement of Battery Performance
To evaluate C-rates of the lithium rechargeable batteries including the separators of Example 1 and Comparative Examples 2 to 6, each of batteries having a capacity of 900 mAh was cycled at discharge rates of 0.2C, 0.5C, 1C, and 2C, and discharge capacity of each battery is shown according to the C-rate in Table 4.

TABLE 3

| | Example 1 | Comparative Example 2 | Comparative Example 3 | Comparative Example 4 | Comparative Example 5 | Comparative Example 6 |
|---|---|---|---|---|---|---|
| DMF remaining amount (ppm) | 70 | 105 | 74 | 82 | 61 | 93 |
| Peel strength (gf/cm$^2$) | 100 | 12 | 10 | 20 | 35 | 45 |
| Thermal shrinkage MD (%) | 15 | 22 | 30 | 28 | 25 | 25 |
| Thermal shrinkage TD (%) | 12 | 17 | 35 | 31 | 27 | 28 |
| Adhesive strength to electrodes (gf/cm$^2$) | 42 | 7 | 5 | 8 | 13 | 17 |

TABLE 4

| | | Ex. 1 | Comp. Ex. 2 | Comp. Ex. 3 | Comp. Ex. 4 | Comp. Ex. 5 | Comp. Ex. 6 |
|---|---|---|---|---|---|---|---|
| C-rate | 0.2 C | 902.7 | 889.3 | 897.8 | 901.3 | 896.9 | 898.3 |
| | 0.5 C | 899.7 | 871.9 | 899.3 | 898.4 | 897.0 | 899.5 |
| | 1.0 C | 889.8 | 843.5 | 887.3 | 888.3 | 882.6 | 886.3 |
| | 2.0 C | 867.5 | 783.4 | 858.8 | 863.3 | 844.6 | 861.7 |

By way of summation and review, a separator for batteries having a slim thickness and a light weight while ensuring high adhesion and shape stability based on high heat resistance is desired for producing high capacity batteries. A separator may include a coating layer of an organic/inorganic mixture formed on one or both sides of a base film by coating inorganic particles and an organic binder polymer thereon. When a coating layer containing inorganic particles is formed on a base film that is susceptible to heat, the coating layer may provide improved heat dissipation may not provide sufficient adhesion. On the other hand, when the content of the inorganic particles is increased to obtain sufficient heat dissipation, the content of an inorganic binder polymer may be lowered in the coating layer, which may result in deterioration of the adhesion. If adhesion between the coating layer and the base film is lowered, the ability of the coating layer to suppress thermal shrinkage of the base film may be weakened. Thus, the possibility of a short circuit between positive and negative electrodes upon overheating of a battery including the separator may be increased.

An organic binder that provides high adhesion may be used to increase adhesion of the coating agent for the base film. However, an organic binder providing high adhesion may not be soluble in a low boiling point solvent such as acetone. Moreover, when a high boiling point solvent is used to dissolve the organic binder, a large amount of solvent may remain on a separator after a coating layer is formed and dried thereon, which may result in deterioration in adhesion.

As described above, embodiments may provide a coating layer formed on a base film using a coating agent containing a polyvinylidene fluoride homopolymer and inorganic particles, which may provide excellent heat dissipation and excellent adhesion. In an embodiment a separator includes a coating layer formed on a base film using a coating agent containing a polyvinylidene fluoride homopolymer having a weight average molecular weight of about 1,000,000 g/mol or more and a solvent capable of dissolving the polyvinylidene fluoride homopolymer, and a remaining amount of the solvent in the coating layer may be about 100 ppm or less. In an example embodiment, a separator may include a coating layer having excellent adhesion and excellent heat dissipation formed on a base film using a coating agent that contains inorganic particles together with a polyvinylidene fluoride homopolymer. Such a coating layer may be strongly attached to the base film to achieve efficient suppression of thermal shrinkage of the separator.

Embodiments may also provide an electrochemical battery that includes a separator according to an example embodiment. In the battery, short circuit of electrodes due to generation of heat upon use of the battery may be prevented, and a light weight, slim structure, and/or high capacity may be provided. A separator according to an embodiment includes a coating layer that contains inorganic particles and a polyvinylidene fluoride homopolymer, and a remaining amount of solvent may be about 100 ppm or less in the coating layer. The separator may exhibit excellent adhesion and excellent shape stability upon overheating of the battery.

In the separator according to an embodiment, a polyvinylidene fluoride homopolymer may be used as an organic binder component for a coating agent, which may provide the coating layer of the separator with improved adhesion.

In a separator according to an embodiment, a coating layer may have excellent adhesion and excellent heat dissipation, and may be strongly attached to a base film, which may help suppress thermal shrinkage of the separator. Further, the separator may exhibiting excellent adhesion and may help suppressing thermal shrinkage, and may be applied to a battery to help prevent short circuit of electrodes due to overheating of the battery, thereby improving stability and lifespan.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator, comprising:
a polyolefin base film and a coating layer on one or both sides of the polyolefin base film, the coating layer containing, based on 100 parts by weight of the coating layer in terms of solid content, 5 to 10 parts by weight of a polyvinylidene fluoride homopolymer, 5 to 20 parts by weight of a polyvinylidene fluoride-hexafluoropropylene copolymer, a solvent, and 70 to 90 parts by weight of inorganic particles, the solvent being present in an amount of 100 ppm or less in the coating layer,
wherein the polyvinylidene fluoride homopolymer has a weight average molecular weight of 1,000,000 g/mol or more and the polyvinylidene fluoride-hexafluoropropylene copolymer has a weight average molecular weight of 800,000 g/mol or less.

2. The separator as claimed in claim 1, wherein the polyvinylidene fluoride homopolymer has a weight average molecular weight of 1,000,000 g/mol to 1,200,000 g/mol, and the polyvinylidene fluoride-hexafluoropropylene copolymer has a weight average molecular weight of 600,000 g/mol to 800,000 g/mol.

3. The separator as claimed in claim 1, wherein the solvent has a boiling point of 140° C. or more.

4. The separator as claimed in claim 3, wherein the solvent includes one or more of dimethylformamide, dimethylsulfoxide, dimethylacetamide, or N-methylpyrrolidone.

5. The separator as claimed in claim 1, wherein the inorganic particles include one or more of $Al_2O_3$ particles, $SiO_2$ particles, $B_2O_3$ particles, $Ga_2O_3$ particles, $TiO_2$ particles, or $SnO_2$ particles.

6. The separator as claimed in claim 1, wherein the coating layer is formed by dip coating.

7. The separator as claimed in claim 1, wherein the coating layer has a peel strength of 50 gf/cm$^2$ or more.

8. The separator as claimed in claim 1, wherein an adhesive strength between the coating layer and electrodes of a battery is 20 gf/cm$^2$ or more.

9. The separator as claimed in claim 8, wherein the battery is a lithium rechargeable battery.

10. The separator as claimed in claim 9, wherein:
the electrodes include a positive electrode and a negative electrode,
the positive electrode is selected from the group of a lithium cobalt oxide electrode, a lithium nickel cobalt manganese oxide electrode, a lithium manganese oxide electrode, a lithium iron phosphate electrode, and a lithium nickel oxide electrode, and
the negative electrode is selected from the group of a crystalline carbon electrode and amorphous carbon electrode.

11. The separator as claimed in claim 1, wherein the separator has a thermal shrinkage of 30% or less in a machine direction or in a transverse direction, as measured after leaving the separator at 150° C. for 1 hour.

12. An electrochemical battery, comprising:
a positive electrode, a negative electrode, an electrolyte, and the separator as claimed in claim 1.

13. The electrochemical battery as claimed in claim 12, wherein the electrochemical battery is a lithium rechargeable battery.

14. A secondary battery, comprising:
a positive electrode;
a negative electrode;
an electrolyte; and
a separator interposed between the positive electrode and the negative electrode, the separator having a coating layer thereon, the coating layer being formed by dissolving a polyvinylidene fluoride-hexafluoropropylene copolymer having a weight average molecular weight of 800,000 g/mol or less in a first solvent to provide a first mixture, dissolving a polyvinylidene fluoride homopolymer having a weight average molecular weight of 1,000,000 g/mol or more in a second solvent to provide a second mixture, combining the first mixture and the second mixture with inorganic particles to form a coating agent, applying the coating agent to the separator, and removing the solvent from the applied coating agent so as to provide the coating layer with a residual amount of solvent of 100 ppm or less.

15. The secondary battery as claimed in claim 14, wherein the second solvent has a boiling point of 140° C. or more.

16. The secondary battery as claimed in claim 14, wherein the second solvent includes one or more of dimethylformamide, dimethylsulfoxide, dimethylacetamide, or N-methylpyrrolidone.

17. The secondary battery as claimed in claim 16, wherein the removing of the solvent includes drying the separator with the coating agent thereon at a maximum temperature of 120° C. or less.

18. The separator as claimed in claim 1, further comprising a base film on which the coating is formed, the base film being a polyethylene monolayer film having a thickness of 1 μm to 25 μm.

* * * * *